(12) United States Patent
Kolhi (10) Patent No.: US 7,961,750 B2
(45) Date of Patent: Jun. 14, 2011

(54) MULTICAST CONTROL

(75) Inventor: Johan Kolhi, Vaxholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 12/302,173

(22) PCT Filed: May 31, 2006

(86) PCT No.: PCT/SE2006/000648
§ 371 (c)(1),
(2), (4) Date: Nov. 24, 2008

(87) PCT Pub. No.: WO2007/139458
PCT Pub. Date: Dec. 6, 2007

(65) Prior Publication Data
US 2009/0141735 A1 Jun. 4, 2009

(51) Int. Cl.
*H04J 3/26* (2006.01)
*H04N 7/173* (2006.01)

(52) U.S. Cl. .................. 370/432; 725/118

(58) Field of Classification Search .......... 370/431–433, 370/351, 389, 390; 709/230, 231, 238
See application file for complete search history.

(56) References Cited

U.S. PATENT DOCUMENTS

| | | | | |
|---|---|---|---|---|
| 7,359,939 B2* | 4/2008 | Poulsen et al. | ............... | 709/204 |
| 7,558,870 B2* | 7/2009 | Parker | ...................... | 709/231 |
| 7,593,326 B2* | 9/2009 | Collet et al. | ................. | 370/229 |
| 7,664,053 B2* | 2/2010 | Chen et al. | ..................... | 370/254 |
| 2003/0145102 A1* | 7/2003 | Keller-Tuberg | ............... | 709/237 |
| 2004/0090970 A1* | 5/2004 | Sanchez et al. | ............... | 370/397 |
| 2006/0015928 A1* | 1/2006 | Setty et al. | ..................... | 725/148 |
| 2007/0036547 A1* | 2/2007 | Blakley et al. | .................. | 398/71 |
| 2007/0047545 A1* | 3/2007 | Bou-Diab et al. | ............. | 370/390 |
| 2007/0101377 A1* | 5/2007 | Six et al. | ......................... | 725/86 |
| 2007/0140270 A1* | 6/2007 | Hulkkonen | .................... | 370/401 |
| 2007/0297448 A1* | 12/2007 | Heikens et al. | ............... | 370/468 |
| 2008/0068990 A1* | 3/2008 | Wu | ................................ | 370/229 |
| 2008/0250456 A1* | 10/2008 | Gervais et al. | .................. | 725/54 |

FOREIGN PATENT DOCUMENTS

| EP | 1427132 A2 | 6/2004 |
|---|---|---|
| WO | WO 2005084025 A1 | 9/2005 |
| WO | WO 2005084031 A1 | 9/2005 |

OTHER PUBLICATIONS

Jaegwan Kim et al: Performance evaluation of channel zapping protocol in broadcasting services over hybrid WDM-PON, Advanced Communication Technology, 2005, ICACT 2005. The 7$^{th}$ International Conference on, Feb. 21-23, 2005, vol. 2 pp. 1152-1155, esp p. 1154 and abstract.

* cited by examiner

*Primary Examiner* — Chi H Pham
*Assistant Examiner* — Robert Lopata (57) ABSTRACT

A method and arrangement for optimizing bandwidth usage in a Multicast Services Control System (MSCS), which transports digital information in a multicast stream from a broadband network to a Set Top Box (STB) connected to a terminal TV. When the terminal TV is disabled, and can no longer utilize the multicast stream, the terminal TV sends a terminal status signal to the STB indicating deactivation of the terminal TV. In response, the STB sends an IGMP leave report signal to the broadband network, which then ceases its transmission of the multicast stream to the STB.

15 Claims, 5 Drawing Sheets

MULTICAST CONTROL

FIELD OF INVENTION

The present invention relates to methods and arrangements to optimize bandwidth usage in a multicast services control system for digital information transport.

BACKGROUND

Multicast is the way IP TV is distributed in broadband networks. Set Top Boxes have an important role of receiving and rendering the TV image for the TV sets. A Set Top Box in broadband networks does this by standardized speaking IGMP (Internet Group management Protocol) to the broadband network. The Protocol starts and stops TV streams as well as channel changes. Traffic management is important in digital networks. Traffic management involves the controlling and scheduling of traffic through paths established through a network. The traffic can include audio, video, or any form of digital information. Channel streaming is used to take a group of digital information services and configure them to flow down into a digital network into several channels so as to get the digital information close to an end user so the end user can access the digital information very quickly. Such an implementation is made readily available for digital networks that have capacity, such as extra bandwidth, that enables the flow of digital services closer in proximity to an end user so that the end user can retrieve them more quickly. Channel streaming is intended to improve behaviour of almost any Ethernet topology. However, benefits of channel streaming become more important as the size of the network is increased, and the number of "hops" (i.e., transportation leaps between devices along a path in the broadband network) between a client and a server increases. A multicast services control system for internet protocol television transport can be seen in the US Patent Application US 2006/0015928. A service distribution platform is hereby configured to receive channels from an internet protocol video, which channels are to be forwarded to at least one Set Top Box. The Set Top Box is configured to generate "leave"-signals and to receive "join"-signals to/from the service distribution platform, which signals triggers subtractions and additions of channels received to the box. Each received channel corresponds to bandwidth consumption and each subtracted channel corresponds to bandwidth acquisition.

Measurements in live networks show that users normally do not turn the Set Top Box off when they stop watching TV. The network load is hereby the same as when someone is watching the TV. By not turning off the Set Top Box, the multicast stream keeps flowing, wasting massive amounts of bandwidth, especially in night-time. A HDTV stream for High Definition TV can be around 6-20 Mbps/channel.

SUMMARY OF INVENTION

The present invention relates to a problem how to minimize waste of bandwidth in a multicast services control system for digital information transport.

The problem is solved by the invention by detecting unused bandwidth consumption and by prevent transportation of information that is unused by the terminals, thereby setting bandwidth free in network.

A purpose with the invention is to save bandwidth for broadband operators that deliver information to receiving terminals. A further purpose is doing this without interfering with existing standards. Yet another purpose is to free the bandwidth as "high up" in network as possible, i.e. as close to a sending server as possible.

The solution to the problem more in detail is a method to optimize bandwidth usage in a multicast services control system for digital information transport. The control system comprises a Set Top Box attached to a broadband Network. The Set Top Box receives a multicast stream from the Broadband Network, which stream is rendered to a terminal. The terminal is disabled for utilization of the rendered multicast stream. The method comprises the following steps:

The Set Top Box receives a terminal status signal that indicates de-activation of the terminal;

An IGMP leave report signal is sent from the Set Top Box to the Broadband Network.

The multicast stream sent to the Set Top Box is terminated in the broadband network.

Thus, the aim of the invention is to overcome the above mentioned and other related problems. This is done by methods, arrangements, systems and articles of manufacture An advantage with the invention is that the bandwidth in the network can be utilized for other things than transmitting to a turned off terminal.

Another advantage with the invention is that it will not break any existing standards. The invention will in a new way use and map existing IGMP signalling and a SCART signal or similar from the terminal to the Set Top Box.

The invention will now be described more in detail with the aid of preferred embodiments in connection with the enclosed drawings. Other aspects and advantages of the present invention will become apparent from the following detailed description, taken in conjunction with the accompanying drawings, illustrating the principles of the invention by way of example only.

DETAILED DESCRIPTION OF THE INVENTION

Figure 1:
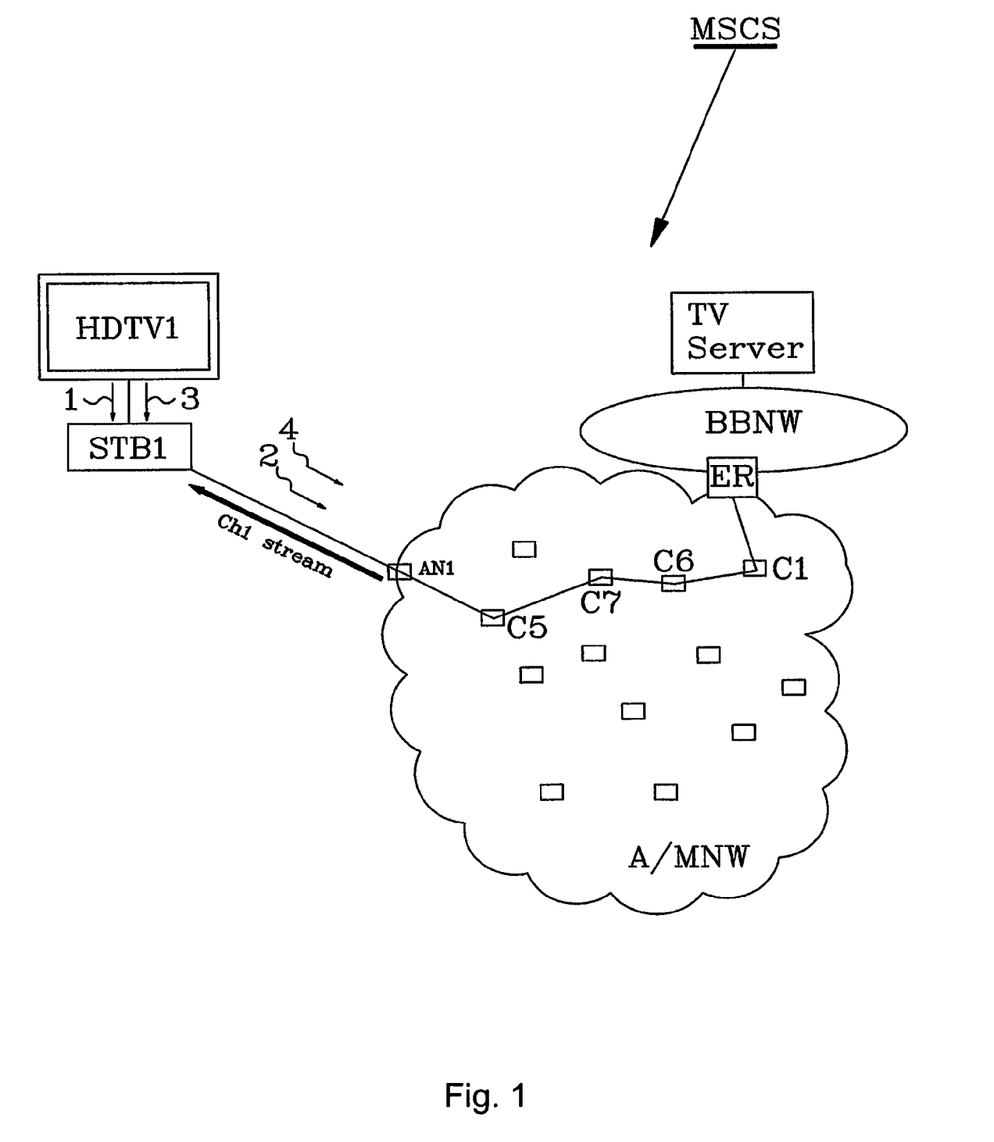
FIG. 1 discloses a block schematic illustration of a multicast services control system wherein a TV Server delivers a multimedia stream to a client through a Broadband Network.

FIG. 1 discloses a block schematic illustration of a multicast services control system MSCS for digital information transport, in this example the information transport is equal to internet protocol transport. The system in the example comprises a Broadband Network i.e. an Access/Metro Network A/MNW that comprises an Access Node AN1 (e.g. a DSLAM) and a number of concentrators C1, C5-C7. A DSLAM separates the voice-frequency signals from the high-speed data traffic and controls and routes digital subscriber line (xDSL) traffic between the subscriber's end-user equipment (router, modem, or network interface card) and the network service provider's network. The AN1 is connected to a Set Top Box STB1 and the concentrators direct an incoming multimedia stream through the network to AN1. The concentrators handles the multimedia stream distribution and makes sure that one channel only is transmitted once, and only when needed by underlying ANs. The Access/Metro Network is attached to a backbone Network BBNW via an Edge Router ER. A TV Server for providing a range of TV channels to be delivered to the A/MNW is attached to the BBNW. Based upon IGMP join signals, selected channels can be directed from the TV Server through the Broadband Network A/MNW, via the concentrators, to a channel ordering client. The IGMP message is only forwarded as far as needed, it stops at the first concentrator that has the channel. Only in the case where no concentrator has the channel, it's forwarded to the edge router that starts the stream. The TV-server never sees the multicast messages itself, it is only responsible for feeding the network with the channel stream(s). A client is represented in this example by a High Definition TV set, a so called terminal HDTV1. To be observed is that any kind of terminal such as for example an ordinary TV set or computer terminal can be used in the invention. The terminal can even comprise a combination of TV/Video/DVD etc. The HDTV1 in FIG. 1 is connected with a SCART (Syndicat des Constructeurs d'Appareils Radiorécepteurs et Téléviseurs) or HDMI (High-Definition Multimedia Interface) connector or similar to the Set Top Box STB1. The SCART connector is used for combined audio and video connections. A formal description is given in the CENELEC EN 50 049-1:1989 standard or in the IEC 933-1 standard. HDMI is an all-digital audio/video interface. HDMI provides an interface between any audio/video source, such as a Set Top Box, DVD player, or A/V receiver and an audio and/or video monitor, such as a digital television (DTV), over a single cable.

In this example, upon receiving from STB1 to the Edge Router ER, a join signal that requests channel 1, a link is set up in A/MNW between the Edge Route ER and the Access Node AN1 via the concentrators C1, C6, C7 and C5. A Multimedia stream i.e. the CH1 stream in FIG. 1, is hereby sent over the link from the TV Server to the Set Top Box STB1. The Set Top Box has the role of receiving the CH1 stream and rendering a TV image of the CH1 stream to the TV set HDTV1. The SCART (or HDMI) connector that connects the HDTV with STB1 is bi-directional and a terminal status signal is constantly sent out from the TV set, telling the Set Top Box if the TV set is active or not i.e. turned on or off. By letting the Set Top Box monitor a signal from the TV set via a pin on the SCART connector, it can tell if the TV set is off on. To be noted is that the status signal might as well be sent separately over a wireless link such as for example a bluetoth link or other wireless media.

A method according to a first embodiment of the invention will now be explained together with FIG. 1. The user of the TV set HDTV1 turns off the TV set. The method according to this first embodiment comprises the following steps:

The Set Top Box STB1, that continuously monitors the terminal status signal received from the terminal HDTV1, detects a de-activation signal 1 from the terminal. The signal 1 indicates turn-off of the TV set.

The Set Top Box begins counting a few seconds delay period, for example 5-10 seconds, to make sure that the turn off of the TV set was not accidental.

After extended delay period the Set Top Box sends an IGMP leave report signal 2 to the AN1 in the Broadband Network.

The signal 1 is forwarded from AN1 through the network via the concentrators C5, C7, C6 and C1 all the way until it reaches the originating (also called first) point of the CH1 stream destined for STB1 in the broadband network. This takes place according to standardized well-known multicast routing schemes. The Edge Router ER is the originating point in the network of the CH1 stream destined for STB1.

ER stops multicasting the CH1 towards STB1 and the former used path ER-C1-C6-C7-C5-AN1 is hereby available for, e.g., new multicast streaming thanks to the fact of the bandwidth that now is set free.

As a continuation of this first embodiment, the TV set again is turned on, for example if the set was turned off in the evening and again turned on in the morning. The method then comprises the following further steps:

The Set Top Box STB1, that continuously monitors the terminal status received from the terminal HDTV1, detects an activation signal 3 from the terminal, meaning that the TV Set again has been turned on.

The Set Top Box sends an IGMP join report signal 4 requesting last viewed channel i.e. CH1 to the AN1 in the Broadband Network. The signal 4 is forwarded from AN1 through the network via for example the concentrators C5, C7, C6 and C1 all the way until it reaches an originating (also called start) point of the CH1 stream in the broadband network. The ER is the originating point of the CH1 stream destined for STB1 i.e. this is the first point along the path were the CH1 stream was found. The IGMP message is only forwarded as far as needed, it stops at the first concentrator that has the channel. Only in the case where no concentrator has the channel, it's forwarded to the edge router that starts the stream. The TV-server never sees the multicast messages itself, it is only responsible for feeding the network with the channel stream(s).

ER starts multicasting the CH1 stream towards AN1 using the found path ER-C1-C6-C7-C5-AN1.

STB1 receives the CH1 stream from AN1 and forwards a rendered TV image to HDTV1.

Figure 2:
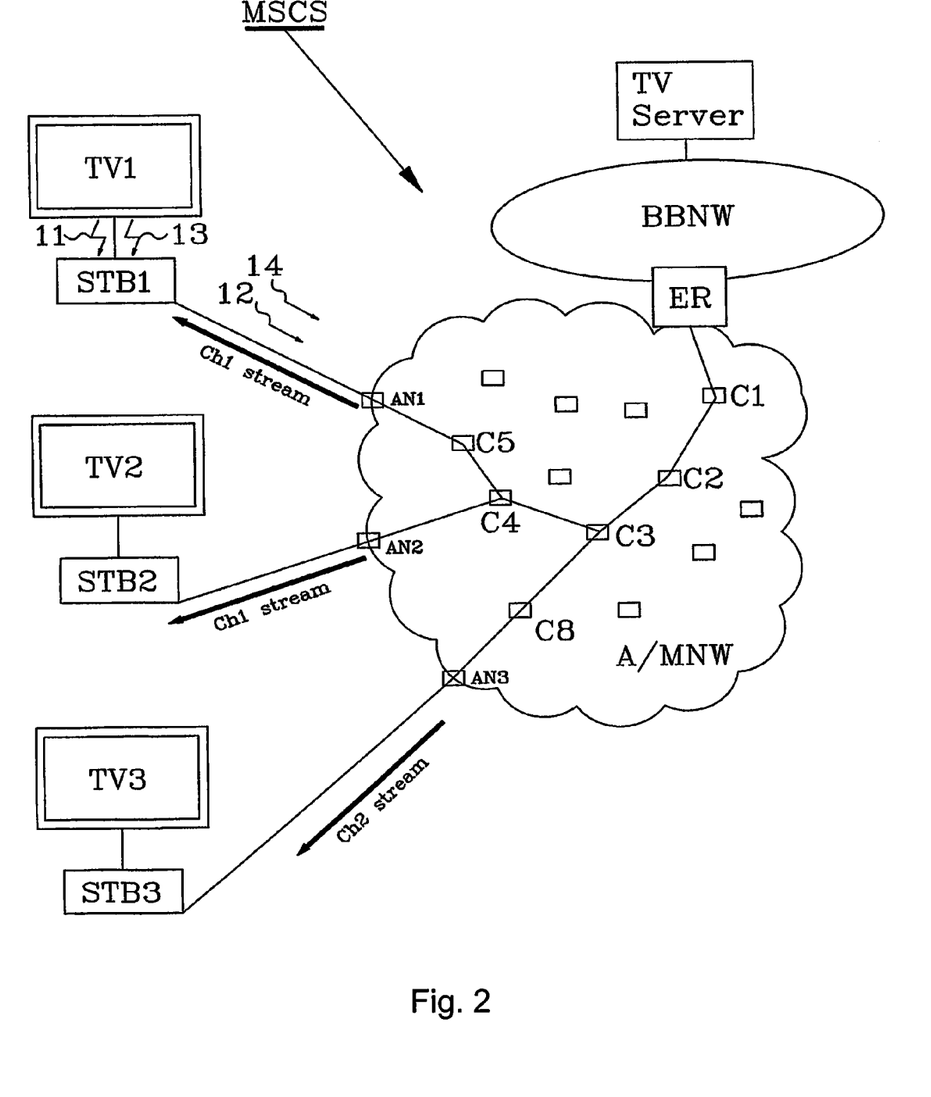
FIG. 2 discloses a block schematic illustration of a multicast services control system wherein a TV Server delivers a first multimedia stream to two clients and a second multimedia stream to another client.

FIG. 2 discloses in a block schematic illustration, a multicast services control system MSCS of the same type as was shown in FIG. 1. The system in the example comprises a Broadband Network A/MNW that comprises Access Nodes AN1-AN3 and a number of concentrators C1-C5, C8. The TV server provides a range of TV channels that are delivered over a communication link to the Edge Router ER. Based upon IGMP join signals, selected channels can be directed from ER through the Broadband Network A/MNW to a channel ordering client. Three clients, represented in this example by ordinary TV sets, so called terminals TV1-TV3, can be seen in FIG. 2.

In this example, after a received join signal to ER that requests channel 1 to be sent to AN1, a link is set up between ER and AN1 via the concentrators C1-C5. A Multimedia stream i.e. the CH1 stream in FIG. 2, is hereby sent over the link from the TV Server to the Set Top Box STB1. Reception of a join signal to ER, that requests channel 1 to AN2 triggers another link set up between ER and AN2 via the concentrators C1-C4. The CH1 stream in FIG. 2 is hereby sent over the link from the TV Server to the Set Top Box STB2. Reception of a join signal that requests channel 2 to AN3 triggers another link set up between ER and AN3 via the concentrators C1-C3, C8. The CH2 stream in FIG. 2 is sent over the link from the TV Server to the Set Top Box STB3.

A method according to a second embodiment of the invention will now be explained together with FIG. 2. The user of the TV1 turns off the TV set. The method according to this second embodiment comprises the following steps:

The Set Top Box STB1, that continuously monitors the terminal status signal received from the terminal TV1, detects a de-activation signal 11 from the terminal. The signal 11 is in this case a radio signal that indicates turn-off of the TV set.

The Set Top Box sends an IGMP leave report signal 12 to the AN1 in the Broadband Network.

The signal 12 is forwarded from AN1 through the network via the concentrators C5 and C4 all the way until it reaches a first point where the CH1 stream is destined solely for STB1 in the broadband network. Since the Ch1 stream already is ordered by STB2 and the CH1 stream is "divided" in C4 to be destined to both STB1 and STB2, the concentrator C4 is considered as the first point where Ch1 is destined solely for STB1.

C4 stops multicasting the CH1 towards STB1 and the former used path C4-C5-AN1 is hereby available for any kind of use, e.g. new multicast streaming, thanks to the fact of the bandwidth that is set free.

As a continuation of the second embodiment, the TV set again is turned on. The method then comprises the following further steps:

The Set Top Box STB1 detects an activation signal 13, meaning that the TV Set again has been turned on.

The Set Top Box sends an IGMP join report signal 14 requesting last viewed channel i.e. CH1 to the AN1 in the Broadband Network.

The IGMP join report signal 14 signal is forwarded from AN1 through the network towards ER until it reaches a point where the CH1 stream is found. Since the Ch1 stream still is sent to STB2, C4 is the first (start) point along the path where the CH1 stream was found.

C4 starts multicasting the CH1 stream towards STB1 using the path C4-C5-AN1.

STB1 receives the CH1 stream from AN1 and forwards a rendered TV image to TV1.

Figure 3:
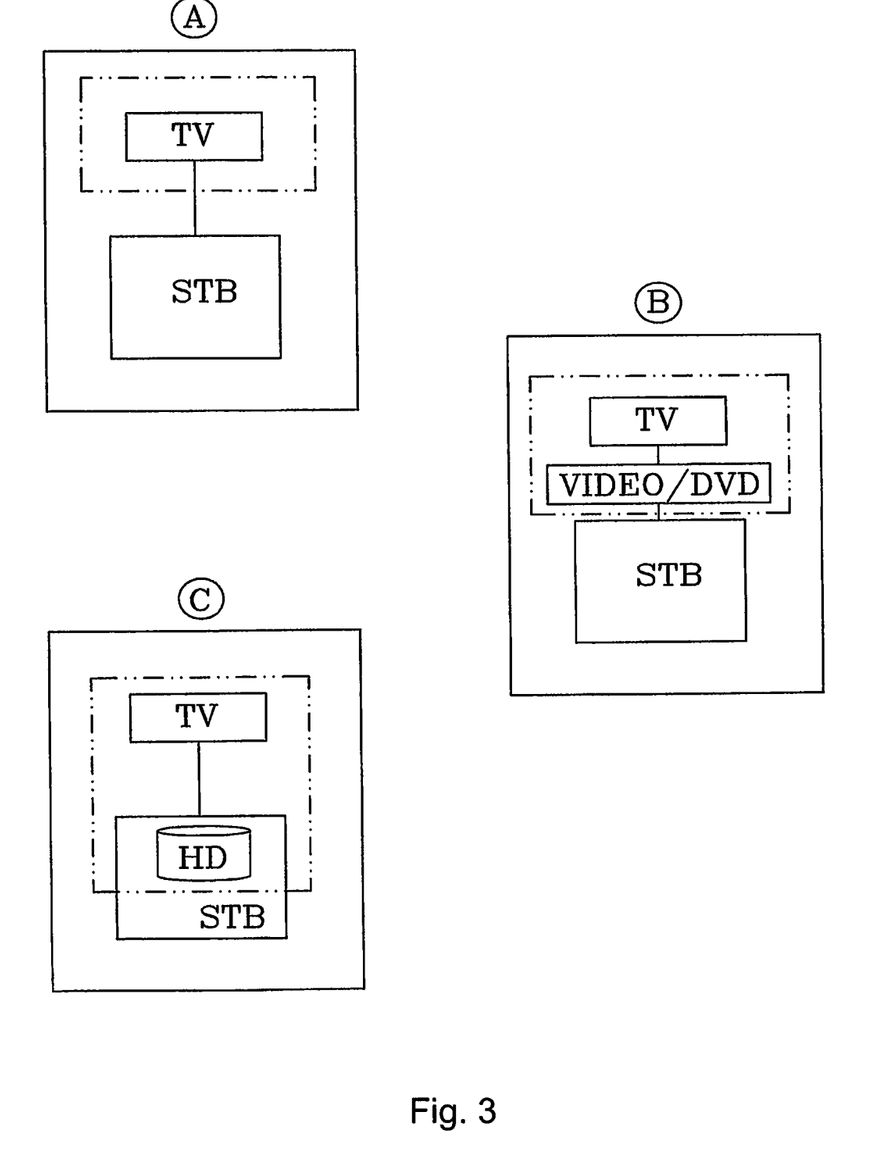
FIG. 3 discloses examples of terminal configurations.

FIG. 3 shows some examples of possible terminal configurations that can be used to put the invention into practice. The figure discloses three configurations A, B and C. The terminal part can be seen within divided lines forming a square in each configuration. The configuration A is the one that already has been explained in FIGS. 1 and 2. The terminal part in configuration B comprises a TV connected to a VIDEO- or DVD-recorder and the terminal part in configuration C comprises a TV connected to a Set Top Box including a hard-disc HD for recording of rendered multimedia streams. In configuration B, as long as the video recorder is turned off, the signalling between the TV and the STB passes through the video and configuration A is applicable. If the video/DVD recorder is pre-programmed for recording at a certain time and if the TV (and video) has been turned off and consequently the media stream is disrupted according to the invention, se following will happen when the recorder starts recording. If the video recorder is turned on, it will act as a terminal and keep the multicast stream running all the time. If the video recorder is in standby, the multicast stream will be terminated by the STB. When it's time to record, the video turns itself on (by the timer in the video recorder). The STB will see that the video recorder is active, and send an IGMP join message to the network for the last viewed channel. In configuration C, the HD works in the same way as the DVD in configuration B and the same procedure will take place.

Figure 4:
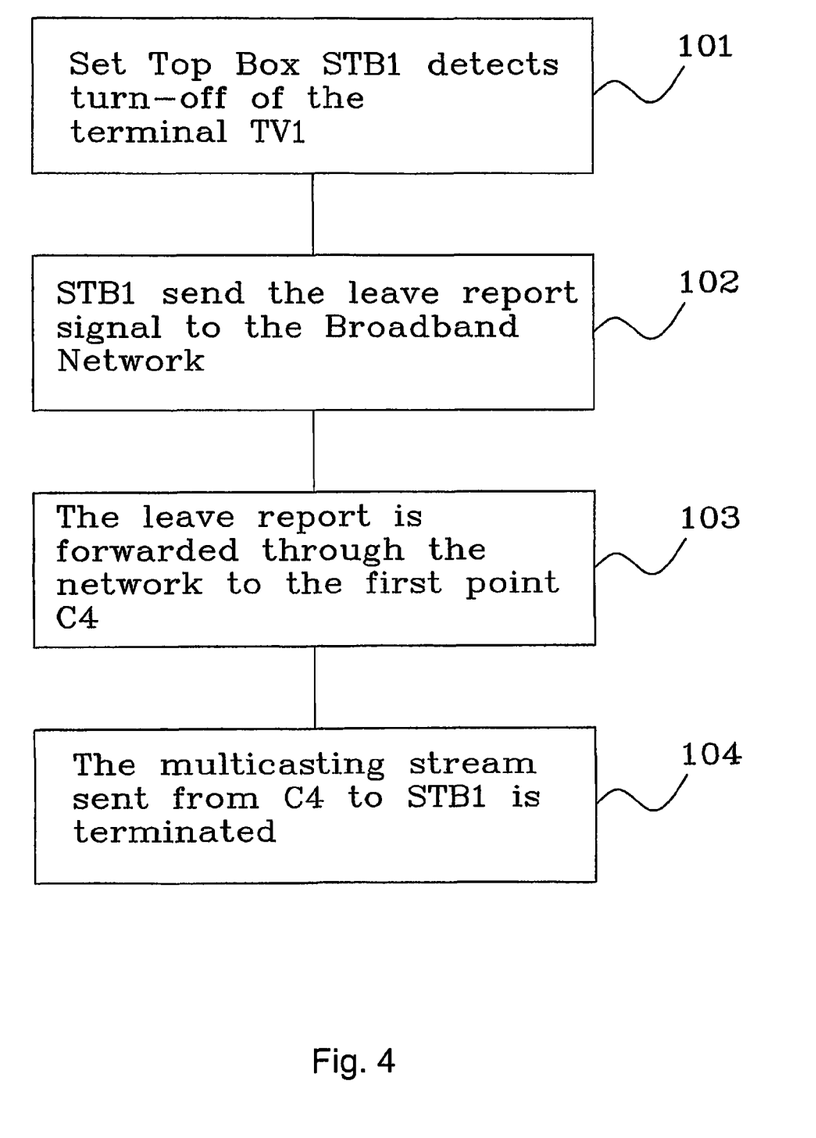
FIG. 4 discloses a flowchart illustrating some essential method steps of the invention.

In FIG. 4, a flowchart illustrating some essential method steps of the invention is shown. The flowchart is to be read together with the earlier shown figures. The flowchart comprises the following steps:

The Set Top Box STBL detects the de-activation signal 11 from the terminal TV1. The signal 11 indicates turn-off of the terminal. This step is disclosed in FIG. 3 by a block 101.

The Set Top Box sends the IGMP leave report signal 12 to the AN1 in the Broadband Network. This step is disclosed in FIG. 3 by a block 102.

The signal 12 is forwarded from AN1 through the network via the concentrators C5 and C4 all the way until it reaches a first point where the CH1 stream is destined solely for STB1 in the broadband network. The concentrator C4 is considered as the first point where Ch1 destined solely for STB1. This step is disclosed in FIG. 3 by a block 103.

The originating point i.e. the concentrator C4 stops multicasting the CH1 towards STB1 in A/MNW. This step is disclosed in FIG. 3 by a block 104.

Figure 5:
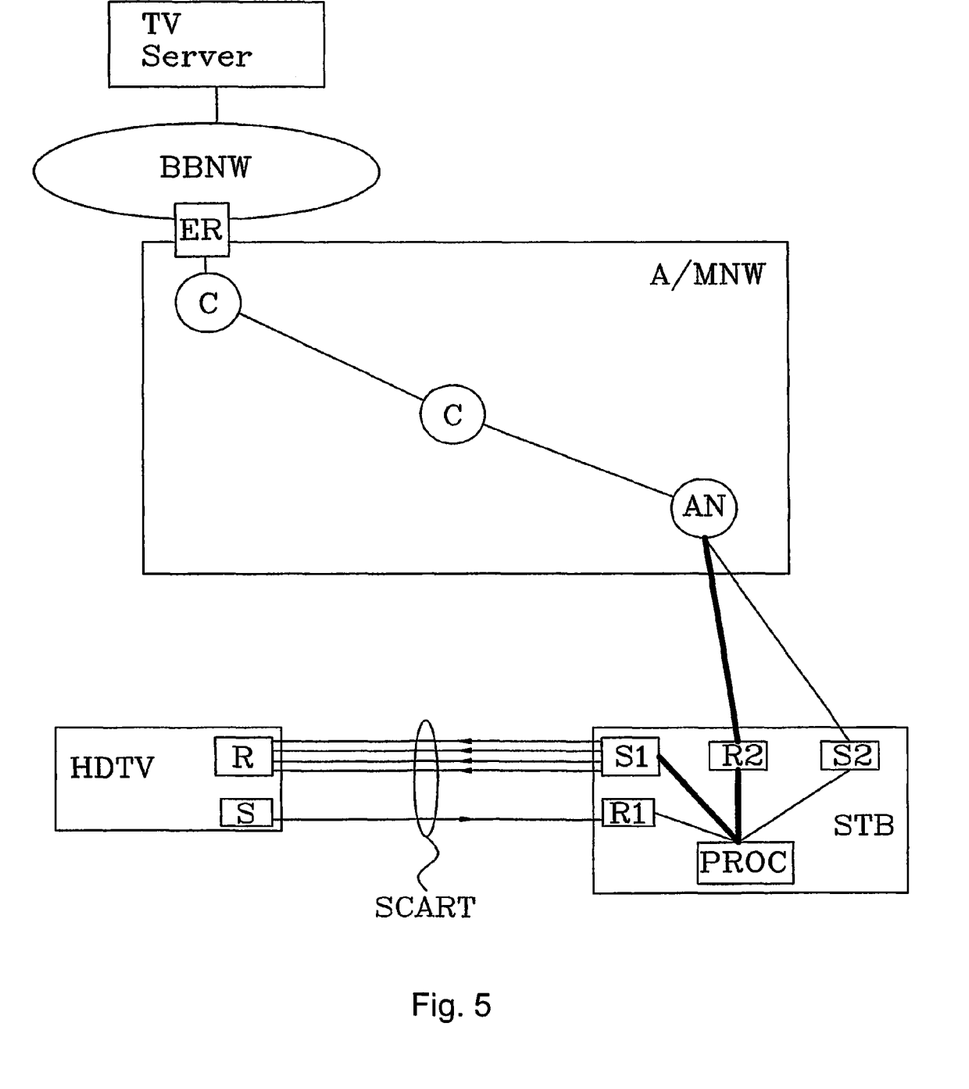
FIG. 5 discloses a block schematic illustration of a system that can be used to put the invention into practice.

A system/arrangement that can be used to put the invention into practice is schematically shown in FIG. 5. The block schematic constellation corresponds to the ones disclosed in FIGS. 1 and 2. The TV Server, via BBNW, and the Set Top Box are connected to the Broadband network A/MNW. Concentrators C and an Access Node AN are located within the network. A receiver R2 in the Set Top Box receives the digital information that after processing in a processor PROC is sent to a sender S1 that sends a rendered TV image to a receiver R in the Television Set HDTV. A sender S in the HDTV indicates a TV-off/on signal to a receiver R1 in the Set Top Box. After processing in PROC, a sender S2 sends leave- or join-report signals from the Set Top Box to the Broadband Network. Enumerated items are shown in the figure as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The invention can for example be implemented in various kinds of systems like Ethernet DSL etc. The exemplified terminal configurations shown in FIG. 3 can vary and still be within the scope of the invention.

The invention claimed is:

1. A method of optimizing bandwidth usage in a multicast services control system (MSCS) for digital information transport, wherein the MSCS includes a broadband Network transmitting a multicast stream to a Set Top Box (STB) connected to a terminal, said method comprising the steps of:
   receiving by the STB, a terminal deactivation signal from the terminal indicating that the terminal has been deactivated; and
   in response to the terminal deactivation signal, sending an Internet Group Management Protocol (IGMP) leave report signal from the STB to a first point in the broadband network where the multicast stream is sent solely to the STB.

2. The method according to claim 1, further comprising stopping by the first point in the broadband network, the transmission of the multicast stream from the broadband network to the STB in response to the IGMP leave report signal.

3. The method according to claim 1, further comprising, prior to receiving the terminal deactivation signal, the step of initiating transmission of the stream from the broadband network to the STB, said initiating step comprising:
receiving by the STB, a terminal activation signal indicating that the terminal has been activated;
sending an IGMP join report signal from the STB to the broadband network in response to the terminal activation signal, said IGMP join report signal requesting initiation of the multicast stream to the STB; and
initiating transmission of the stream from the broadband network to the STB in response to the IGMP join report signal.

4. The method according to claim 3, wherein the step of sending the IGMP join report signal includes sending the IGMP join report signal to a start point in the broadband network where the multicast stream is first detected.

5. The method according to claim 4, wherein the step of initiating the transmission of the multicast stream includes initiating the transmission of the multicast stream in the start point in the broadband network.

6. The method according to claim 1, further comprising starting a delay timer by the STB upon receiving the terminal deactivation signal, wherein the step of sending the IGMP leave report signal includes sending the IGMP leave report signal after the delay timer expires.

7. An arrangement for optimizing bandwidth usage in a multicast services control system (MSCS) for digital information transport, wherein the MSCS includes a broadband Network transmitting a multicast stream to a Set Top Box (STB) connected to a terminal, said arrangement comprising:
means within the STB for receiving a terminal deactivation signal from the terminal indicating that the terminal has been deactivated; and
means within the STB for sending an Internet Group Management Protocol (IGMP) leave report signal from the STB to a first point in the broadband network where the multicast stream is sent solely to the STB.

8. The arrangement according to claim 7, further comprising means within the first point in the broadband network for stopping the transmission of the multicast stream from the broadband network to the STB in response to the IGMP leave report signal.

9. The arrangement according to claim 8, further comprising means for initiating transmission of the stream from the broadband network to the STB, said initiating means comprising:
means within the STB for receiving a terminal activation signal indicating that the terminal has been activated;
means within the STB for sending an IGMP join report signal from the STB to the broadband network in response to the terminal activation signal, said IGMP join report signal requesting initiation of the multicast stream to the STB; and
means within the broadband network for initiating transmission of the stream from the broadband network to the STB in response to the IGMP join report signal.

10. The arrangement according to claim 9, wherein the means for sending the IGMP join report signal includes means for sending the IGMP join report signal to a start point in the broadband network where the multicast stream is first detected.

11. The arrangement according to claim 10, wherein the means for initiating the transmission of the multicast stream is implemented within the start point in the broadband network.

12. The arrangement according to claim 7, further comprising a delay timer for measuring a time delay starting upon receiving the terminal deactivation signal, wherein the means for sending the IGMP leave report signal sends the IGMP leave report signal after the delay timer expires.

13. The arrangement according to claim 7, wherein the terminal comprises a combination of at least one monitor and at least one recorder.

14. The arrangement according to claim 7, wherein the means within the STB for receiving the terminal deactivation signal is a wireless receiver.

15. An article for manufacture comprising a non-transitory program storage memory having computer readable program code embodied therein, wherein the program code causes a processor of a Set Top Box (STP) to perform the following steps when the program code is run on the processor:
receiving a terminal deactivation signal from the terminal indicating that the terminal has been deactivated; and
sending an Internet Group Management Protocol (IGMP) leave report signal from the STB to a first point in the broadband network where the multicast stream is sent solely to the STB.

* * * * *

UNITED STATES PATENT AND TRADEMARK OFFICE
CERTIFICATE OF CORRECTION

| | |
|---|---|
| PATENT NO. | : 7,961,750 B2 |
| APPLICATION NO. | : 12/302173 |
| DATED | : June 14, 2011 |
| INVENTOR(S) | : Kolhi |

It is certified that error appears in the above-identified patent and that said Letters Patent is hereby corrected as shown below:

In Column 3, Line 47, delete "bluetoth" and insert -- bluetooth --, therefor.

In Column 6, Line 1, delete "STBL" and insert -- STB1 --, therefor.

In Column 8, Line 34, in Claim 15, delete "(STP)" and insert -- (STB) --, therefor.

Signed and Sealed this
Thirteenth Day of March, 2012

David J. Kappos
*Director of the United States Patent and Trademark Office*